US012500383B2

(12) United States Patent
El Ouardi et al.

(10) Patent No.: US 12,500,383 B2
(45) Date of Patent: Dec. 16, 2025

(54) ELECTRONIC ASSEMBLY

(71) Applicant: Robert Bosch GmbH, Stuttgart (DE)

(72) Inventors: Abdessamad El Ouardi, Illingen (DE); Marcus Mohr, Pressath (DE); Raphael Segiet, Reutlingen (DE); Richard Gueckel, Landau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 353 days.

(21) Appl. No.: 18/262,363

(22) PCT Filed: Apr. 29, 2022

(86) PCT No.: PCT/EP2022/061534
§ 371 (c)(1),
(2) Date: Jul. 20, 2023

(87) PCT Pub. No.: WO2022/238151
PCT Pub. Date: Nov. 17, 2022

(65) Prior Publication Data

US 2024/0079830 A1 Mar. 7, 2024

(30) Foreign Application Priority Data

May 11, 2021 (DE) ..................... 10 2021 204 799.8

(51) Int. Cl.
*H01R 13/6585* (2011.01)
*H01R 12/72* (2011.01)
(Continued)

(52) U.S. Cl.
CPC ....... *H01R 13/6585* (2013.01); *H01R 12/724* (2013.01); *H01R 13/514* (2013.01);
(Continued)

(58) Field of Classification Search
CPC .............. H01R 13/6585; H01R 12/724; H01R 13/514; H01R 13/6595; H01R 43/205;
(Continued)

(56) References Cited

U.S. PATENT DOCUMENTS 5,030,140 A 7/1991 Sugiyama
5,102,353 A 4/1992 Brunker et al.
(Continued)

FOREIGN PATENT DOCUMENTS

DE 69901084 T2 10/2002
DE 112018003040 T5 3/2020
(Continued)

OTHER PUBLICATIONS

International Search Report for PCT/EP2022/061534, Issued Aug. 30, 2022.

*Primary Examiner* — Abdullah A Riyami
*Assistant Examiner* — Nader J Alhawamdeh
(74) *Attorney, Agent, or Firm* — NORTON ROSE FULBRIGHT US LLP

(57) ABSTRACT

A shielded electric plug. The electric plug includes a plug housing and a data line arranged within the plug housing for transmitting data in the Gbit/s range. A plug side of the data line electrically contacts the plug with a complementary mating plug and a connection side of the data line for electrically contacting with a circuit carrier. The data line is enclosed by a metal shielding housing. The plug housing includes a connection element with a press-in pin for mechanically contacting the plug with the circuit carrier using a press-in connection. The connection element includes a spring contact element to resiliently abut the circuit carrier so as to contact same when the electric plug is pressed in. The press-in pin is in the form of a first ground
(Continued)

connection, and the spring contact element is designed is in the form of a second ground connection.

16 Claims, 6 Drawing Sheets

(51) Int. Cl.

| | |
|---|---|
| ***H01R 13/514*** | (2006.01) |
| ***H01R 13/6595*** | (2011.01) |
| ***H01R 43/20*** | (2006.01) |
| *H01R 103/00* | (2006.01) |

(52) U.S. Cl.
CPC ....... *H01R 13/6595* (2013.01); *H01R 43/205* (2013.01); *H01R 2103/00* (2013.01)

(58) Field of Classification Search
CPC . H01R 2103/00; H01R 2201/26; H01R 24/50
See application file for complete search history.

(56) References Cited

U.S. PATENT DOCUMENTS

| | | | | |
|---|---|---|---|---|
| 5,199,887 | A | 4/1993 | Iacono | |
| 6,666,720 | B1 | 12/2003 | Reisinger et al. | |
| 9,197,025 | B2 * | 11/2015 | Bolik | H01R 13/04 |
| 2009/0116185 | A1 | 5/2009 | Su et al. | |
| 2014/0364012 | A1 * | 12/2014 | Bolik | H01R 13/521 29/845 |
| 2020/0274299 | A1 | 8/2020 | Hashimoto et al. | |
| 2024/0079830 | A1 * | 3/2024 | El Ouardi | H01R 13/6585 |

FOREIGN PATENT DOCUMENTS

| | | | | |
|---|---|---|---|---|
| DE | 102019219411 | A1 | 6/2021 | |
| DE | 102020202729 | A1 | 9/2021 | |
| EP | 0488482 | A1 * | 6/1992 | H01R 13/6585 |
| EP | 2369686 | A1 | 9/2011 | |
| JP | H0629060 | A | 2/1994 | |
| JP | 2020013748 | A | 1/2020 | |

* cited by examiner

ELECTRONIC ASSEMBLY

FIELD

The present invention relates to a shielded electric plug, a contact arrangement comprising the shielded electric plug and a method for the formation thereof.

BACKGROUND INFORMATION

In the field of driver assistance systems and automated driving, for example, high transmission rates for communication data are necessary, which rates are currently in the multi-gigabit range (several Gbit/s). The reception, processing and forwarding of communication data is handled, for example, by so-called VCUs (vehicle computer units), control devices ECU (electronic control units), bus systems or other electronic devices for a high-speed application. In this case it is necessary for lines and plug systems to transmit these communication data at the required transmission rate with as little interference as possible. Various plug systems are already available for a high-speed application. A significantly limiting factor for a transmission rate that can be achieved with these plug systems is a continuous uninterrupted shielding of the data lines contained thereby. The required shielding must in this case extend from a plug side for contacting with a mating plug to a connection side for contacting a circuit carrier. Furthermore, the market's requirement for miniaturization of plug systems puts still-feasible shielding concepts under further pressure. Many shielding concepts are either too expensive or, due to requirements for small installation space, fail to achieve a connection adequate for a required shielding.

A multi-coaxial plug-in connector for high-frequency signals is described in German Patent Application No. DE 69901084 T2. Here a plurality of high-frequency lines are routed through a metallic shielding block. A metallic end plate and a metallic separating plate are connected to the metallic shielding block.

They divide the inner region into a plurality of sub-channels by which the data lines are individually shielded. Due to the concept, limits are set to a miniaturization which still maintains the shielding.

SUMMARY

An object of the present invention is to provide a high level of shielding in particular for miniaturized plug systems with a high data transmission rate in the Gbit/s range.

This object may be achieved by a shielded electric plug, a contact arrangement comprising the shielded electric plug and a method for the design thereof according to features of the present invention.

According to an example embodiment of the present invention, the starting point is a shielded electric plug comprising a plug housing and, arranged within the plug housing, at least one data line for a data transmission in the Gbit/s range, for example faster than 1 Gbit/s, in particular faster than 10 Gbit/s. The electric plug has at least one plug side of the data line for electrically contacting the plug with a complementary mating plug and a connection side of the data line for electrically contacting with a circuit carrier. The at least one data line is enclosed by a metal shielding housing, at least between the plug side and the connection side. Furthermore, the plug housing comprises at least one connection element with at least one press-in pin for mechanically contacting the plug with the circuit carrier by means of a press-in connection. Furthermore, the connection element has at least one spring contact element which, in the pressed-in state of the electric plug, is designed to contact the circuit carrier with resilient abutment. The at least one press-in pin is in this case designed as a first ground connection and the at least one spring contact element is designed as at least one second ground connection of the electric plug. The ground potential for the press-in pin is provided, for example, via the metal inner wall of a press-in opening in the circuit carrier, and for the spring contact element via a metal region on a circuit carrier side. Advantageously, with the aid of the at least one or further spring contact elements, additional electrical contact points with a ground potential of the circuit carrier can be formed in a simple manner. In this way, a high electromagnetic compatibility of the electric plug can be achieved. This is effected without further additional components and/or without further process steps, since all ground connections are established as the electric plug is pressed in. Not only the number of spring contact elements but also the number of press-in pins can be varied flexibly according to the electrical requirements and the installation space requirements for the electric plug. In comparison with plug designs with a ground connection provided solely by press-in pins, connectors that have a smaller installation space requirement can be realized, in particular with the same or a greater number of additional ground connections. The saving of installation space results only indirectly from the circuit carrier and the elimination of press-in zones there, which require a minimum area requirement laterally and a minimum safety distance from each other. In contrast, abutment contact points of a spring contact element can be placed on a much smaller surface area, with safety distances being less critical. Likewise, with a skillful arrangement of press-in pins and spring contact elements, installation space advantages result in the direction of a circuit carrier edge, where press-in zones likewise have minimum spacing distances or exclusion zones. Overall, the fact that the electric plug can have a smaller design also advantageously enables smaller pitch spacings of the contact connection elements of the electric plug that are arranged on the connection side. In this way, a particularly close and circumferential connection of all elements required for shielding the plug at a ground potential of the circuit carrier is made possible. The electric plug is of course designed such that the contact forces applied by the at least one or more spring contact elements when the plug is pressed in can be maintained by the at least one or more press-in pins. In this case, the holding forces of the press-in pins are defined as a multiple of the contact forces of the spring contact elements. Additional holding forces also result from the at least one or more enclosed data lines when these are each also mechanically and electrically connected to the circuit carrier via a press-in pin on the connection side. Alternatively, the data line is connected via a solder contact.

The shielded electric plug is advantageously suitable as a plug for HF applications, such as a coaxial plug (for example, an antenna), a twisted-pair plug (for example, automotive Ethernet) and further applications (USB, Ethernet, HDMI, etc.).

Advantageous developments and improvements of the method according to the present invention are made possible by the measures disclosed herein.

In an advantageous embodiment of the electric plug of the present invention, the connection element is formed from a shaped sheet metal part. In this case, the connection element can be shaped by means of a shaping technique, as a result of which the connection element is then present, for example, as an embossed sheet metal part, as a deep-drawn sheet metal part, as an impact-extruded part and/or as an extruded part. The connection element is preferably designed as a stamped or lasered bent sheet metal part. The at least one press-in pin and the at least one spring contact element are more preferably formed in one piece. The press-in pin can have an embossing imprint of an embossing tool, by means of which in particular a press-in zone of the press-in pin is defined. In this case, for example, a sheet metal material made of CuSn6 or CuNiSi is used. Other possible sheet metal materials are also possible. Advantageously, the connection element can thus be greatly reduced in cost and can be provided with very high manufacturing accuracy by means of proven manufacturing methods.

In a favorable embodiment of the electric plug of the present invention, the connection element is designed as an end region of the plug housing facing the plug side, from which the at least one press-in pin or further press-in pins and/or the at least one spring contact element or further spring contact elements project in the press-in direction. In particular, the connection element has a terminating edge facing the circuit carrier, on which ideally the at least one or more press-in pins and/or the at least one or more spring contact elements are integrally formed, for example within a shaped sheet metal part. Otherwise, it is also possible to use separate elements which form a press-in pin or a spring contact element and are connected to the connection element. Overall, the embodiment has advantages in that the connection element can be designed to be substantially closed as far as the connection to a circuit carrier. This ensures a continuously high electromagnetic compatibility of the electric plug. In principle, it is advantageous for the connection element or the connection element in abutting contact with a wall portion of the shielding housing to enclose the at least one data line over the longitudinal extension thereof in the end region of the plug housing, wherein in each case at least one press-in pin and/or at least one spring contact element is arranged on opposite sides with respect to the at least one or more data lines. It is thus also achieved that the press-in process can be carried out reliably due to an introduction of force that is then symmetrical. In addition, during connection of a mating plug, particularly high plugging forces can thus be absorbed mechanically. Furthermore, in the most restricted installation space further abutment contacts can be formed between opposite press-in pins by means of further spring contact elements. The connection element or the connection element in abutting contact with the shielding housing in the end region of the plug housing preferably has a frame-like design and is substantially closed. One or more press-in pins are then arranged in each case on two opposite sides. On the other hand, one or more spring contact elements are arranged in each case on the other two opposite sides. Advantageously, the electric plug can be connected to the latter sides very close to a circuit carrier edge.

In an advantageous embodiment of the shielded electric plug of the present invention, the connection element forms an outer surface of the plug housing, wherein the spring contact element extends at most to the outer surface when the plug is pressed in. In this way, the electric plug can be designed to be very compact. The abutment contact points that can be formed by means of the spring contact elements can be flexibly arranged in an application-specific manner between the outer surface and the at least one data line, taking into account a safety distance. This enables skillful use of free spaces. If a plurality of electric plugs are combined in a plug connection—even in combination with other plug types—for example as a multi-pole connector comprising high-speed data lines, signal lines and power supply lines, very small and equal grid dimensions can be realized, in particular on the connection side to a circuit carrier.

Significant advantages with regard to a compact design result from an example embodiment of the shielded electric plug of the present invention, in that the at least one or more spring contact elements is/are in each case designed as a flexural member, in particular as a beam element which is clamped at one or both ends. Flexural member theory is well-modeled in mechanics, so that a needs-based design with regard to load-bearing capacity, spring forces, flexibility and other relevant parameters of the spring contact element is ensured. Especially in the case of spring contact elements in the form of a bending beam whose length is substantially greater than its cross-sectional dimensions, a high elastic deformability can also be achieved even in the case of small dimensions. In the case of connection elements as sheet metal parts, such spring contact elements can be easily produced by punching or lasering. In addition, in these cases the spring contact elements can also be formed in the plane of the sheet metal, so that only a small amount of installation space is taken up overall. In this case, it is additionally possible for the beam element to be integrally formed on the connection element and to have an arcuate shape, so that a defined abutment contact point is created when the electric plug is pressed in. Despite tolerance-related different press-in depths, defined contact points can always be formed on the sheet-metal edge that is then curved. In particular, many abutment contact points can be formed by at least two beam elements being arranged adjacent to one another. Preferably, they are arranged in alignment in a line, wherein in the case of beam elements clamped at one end, the respective free ends face one another or face away from one another.

In a particular embodiment of the shielded electric plug of the present invention, the connection element is formed in one piece with the shielding housing. This embodiment is particularly suitable when the plug side and the connection side are arranged in a 180° outlet and form a straight plug. The shielding housing or the connection element completely surrounds the at least one or more data lines. It is possible for shielding housings to be designed as a sheet metal part.

In the case of angled plugs in which the plug side and the connection side are arranged at an angle to one another, for example at a right angle, advantages become apparent in an embodiment of the shielded plug in which the connection element is electrically contacted with or connected to the shielding housing, in particular by means of a snap-in connection, by means of a press-in connection, by means of a clamping connection, by means of an insulation-displacement connection and/or by means of a bonded connection. Some of these embodiments are further described, for example, in German Patent Application Nos. DE 10 2019 219 411.7 and DE 10 2020 202 729.3. The ground connection can thus be passed on to the shielding housing in a simple and secure manner. The shielding housing is, for example, designed as a die-cast part, in particular made of zinc, a zinc alloy, aluminum or an aluminum alloy.

Alternatively, the shielding housing can also be provided from a sheet metal material.

In a further developed embodiment of the shielded electric plug of the present invention, the at least one or more data lines are accommodated in an insulating body which is arranged within the shielding housing through a receiving opening, wherein the receiving opening for the insulating body is then covered by the at least one connection element in such a way that a shielding effect of the shielding housing is maintained.

In a further optimized embodiment of the shielded plug of the present invention, the shielding housing overlaps at least in regions with the connection element at least in the end region of the plug housing, but at most as far as the at least one spring contact element, wherein recesses in the connection element are covered by the shielding housing to ensure a shielding effect, in particular in the region of the at least one press-in pin. In particular in the case of a design using sheet metal parts, recesses are produced for manufacturing-related reasons, which can be reliably closed in this way while maintaining a high shielding effect.

The present invention also leads to a contact arrangement. According to an example embodiment of the present invention, the contact arrangement includes at least one shielded electric plug according to at least one of the above-described embodiments and a circuit carrier. The circuit carrier has at least one or more press-in openings into which the electric plug is pressed with the at least one or more press-in pins, in each case against a metallized inner wall. Furthermore, a metallized region of the circuit carrier is contacted with resilient abutment by the at least one or more spring contact elements. The respectively metallized inner wall and the respectively metallized region of the circuit carrier have a ground potential of the electrical circuit of the circuit carrier. Such a contact arrangement is formed in particular within a control device or a vehicle computer.

A preferred embodiment of the contact arrangement of the present invention comprises a multi-pole connector with at least one plug collar for receiving a multi-pole hybrid plug. Such a hybrid plug has connection elements of at least two different plug types. in this case, in at least one of the above-described embodiments, at least one or more shielded electric plugs are arranged with their relevant plug side within the plug collar. Furthermore, further plug contact elements that differ from the shielded electric plug are arranged within the plug collar. The plug contact elements and the at least one or more data lines of the at least one or more shielded electric plugs likewise have press-in pins on their relevant connection side to the circuit carrier. These press-in pins are preferably in a linear arrangement with the press-in pins of the at least one or more electric plugs that are contacted at ground potential. Furthermore, all the press-in pins mentioned are in each case pressed into press-in openings of the circuit carrier with preferred observance of an equal grid spacing within the linear arrangement. In this case, grid spacings of <=2 mm, for example <=1.8 mm, in particular <=1.6 mm, can be achieved. Likewise, the shielded electric plugs and the further plug contact elements of other plug types can also be arranged in a plurality of rows within the plug collar. In this case, individual rows can also have only plug contact elements of the same plug type. Likewise, plug contact elements of different plug types can be combined adjacent to one another over a plurality of rows in a local plug region of the multi-pole connector, wherein plug contact elements of other plug types are additionally arranged in one, several or all rows.

The present invention also leads to a method for forming a contact arrangement, in particular in at least one of the above-described embodiments. The contact arrangement in this case comprises a shielded electric plug in at least one of the above-described embodiments and a circuit carrier. The circuit carrier has at least one or more press-in openings with a metallized inner wall and at least one metallized region on a circuit carrier side for the mechanical and electrical connection of the shielded electric plug. The metallized press-in openings and the at least one metallized region in each case have a ground potential of the circuit of the circuit carrier. In this case, according to an example embodiment of the present invention, the following method steps are carried out:

a) pressing the at least one or more press-in pins of the connection element of the electric plug into the one or more metallized press-in openings of the circuit carrier to form at least one first ground connection, b) terminating the press-in process when a final mounting position of the electric plug is reached, wherein at the latest when the final mounting position is reached, the metallized region of the circuit carrier is contacted with resilient abutment by the at least one or the further spring contact elements of the connection element of the electric plug to form at least one second ground connection.

In the case of the contact arrangement and the method for the formation thereof, the same advantages result as have already been described in the case of the shielded electric plug.

BRIEF DESCRIPTION OF THE DRAWINGS

Further advantages, features and details of the present invention can be found in the following description of preferred embodiments of the present invention and with reference to the figures.

DETAILED DESCRIPTION OF EXAMPLE EMBODIMENTS

In the figures, functionally identical components are each denoted by the same reference signs.

Figure 1A:
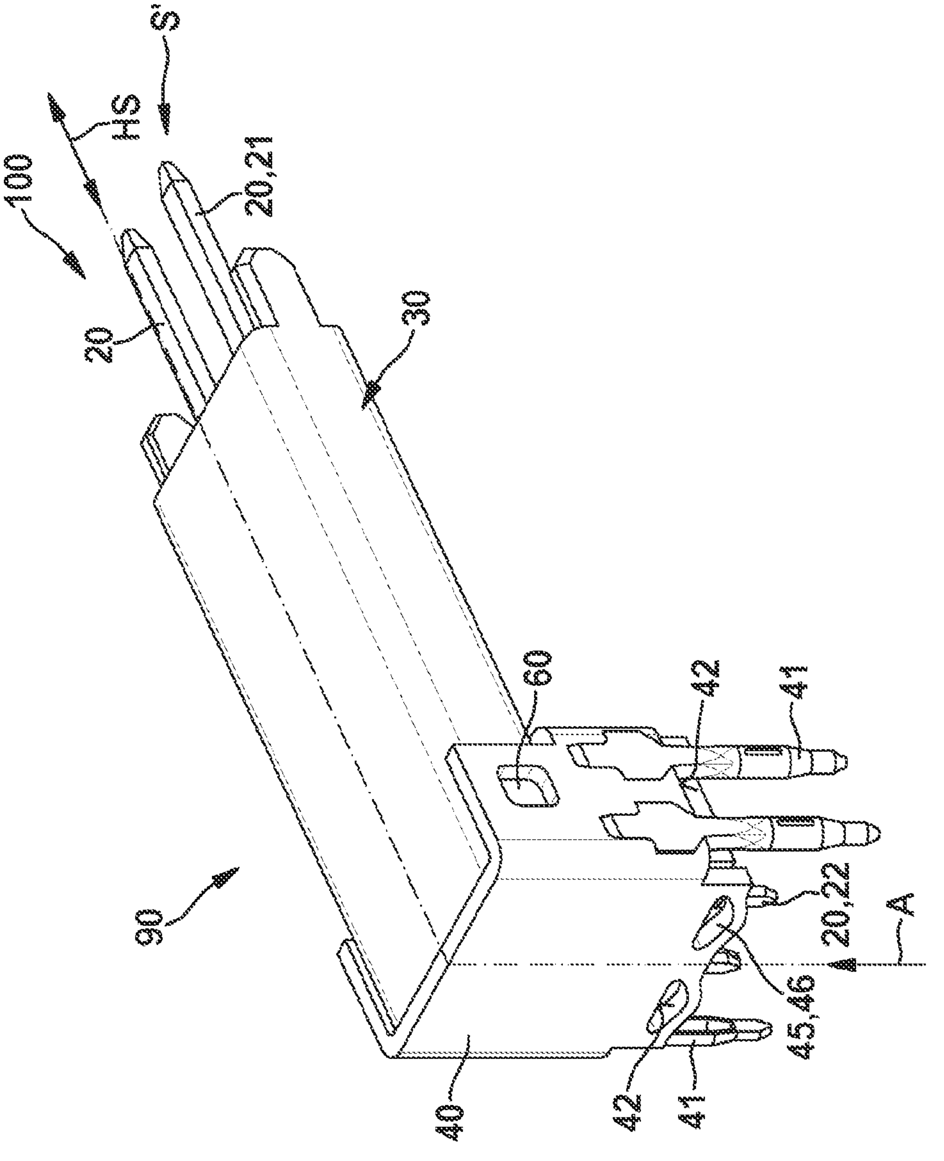
FIG. 1A shows a first embodiment of an angled shielded electric plug in a perspective view, according to the present invention.

FIG. 1A shows a first exemplary embodiment of an angled shielded electric plug 100 in a perspective view. The electric plug 100 is suitable for a high-speed application. With the electric plug 100, data transmission rates of >1 Gbit/s, in particular >10 Gbits/s can be achieved. The electric plug 100 has at least one or more data lines 20, which is/are enclosed by a plug housing 90. In the present angled embodiment, the plug housing 90 is designed to be bent by 90°, for example, along the extension of the data line 20. A plug side S and a connection side A of the electric plug housing 90 or of the data lines 20 are thus arranged at an angle to one another. In principle, the angle can be greater than or less than 90°. A complementary mating plug (not shown) can be connected to the electric plug 100 via the plug side S, for example for receiving and/or transmitting high-speed communication data HS. The electric plug 100 can be electrically connected to a circuit carrier 50 via the connection side A. An electrical circuit 55, for example, is formed on the circuit carrier 50, which circuit is also designed for receiving, processing and transmitting high-speed communication data HS. In the present exemplary embodiment, for example, two data lines 20 are routed in parallel, wherein only one or more than two data lines 20 can also be provided in an application-specific manner. On the plug side S, the data lines 20 are designed, for example, as plug pins 21. Other embodiments are also possible. On the connection side A, the data lines 20 each have a press-in pin 22 on the end face for electrically contacting the circuit carrier 50. Alternatively, the data lines 20 can also be formed on the end face as solder contact connections. The plug housing 90 has a shielding housing 30 which extends from the plug side S to the bend of the electric plug 100. On the other hand, a connection element 40 is arranged from the bend to the connection side A, which connection element forms an outer surface of the plug housing 60 in the present exemplary embodiment. The shielding housing 30 and the connection element 40 are in abutting contact with one another and are connected to one another via wall portions. A connection is made, for example, by means of at least one snap-in connection 60, which is formed, for example, in the bend region of the electric plug 100. Only purely by way of example is it shown in FIG. 1A that the shielding housing 30 has a latching lug which engages behind in a latching receptacle of the connection element in a latching manner. Alternatively, the connection can be effected in a similar manner by a press-in connection, a clamping connection, an insulation-displacement connection and/or by a bonded connection. The shielding housing 40 is designed, for example, as a die-cast part, in particular made of zinc, a zinc alloy, aluminum or an aluminum alloy. Alternatively, the shielding housing 30 can also be provided from a sheet metal material. The connection element 40 is preferably designed as a shaped sheet metal part, in particular as a bent sheet metal part. Between the plug side S and the connection side A, the data lines 20 are enclosed not only by the shielding housing 30 but also by the connection element 40. In the region where the shielding housing 30 and the connection element 40 contact one another, a surrounding wall can be provided in portions by the shielding housing 30 and the connection element 40. In an end region of the plug housing 90 facing the connection side A, the connection element 40 has at least one or more press-in pins 41 which project from a terminating edge 42 of the connection plate 40 in the press-in direction. The at least one or more press-in pins 41 allow the electric plug 100 to mechanically contact the circuit carrier 40. Furthermore, the at least one or more press-in pins 41 are designed as a first ground connection of the electric plug 100. Furthermore, the connection element 40 additionally has at least one or more spring contact elements 45, which, preferably also in the end region mentioned, project in the press-in direction, in particular from a terminating edge 42. The at least one or the further spring contact elements 45 are designed to contact the circuit carrier 50 with resilient abutment in the pressed-in state of the electric plug 100. Furthermore, the at least one or the further spring contact elements 45 are designed as a second ground connection of the electric plug 100. If the connection element 40 is provided in the form of a bent sheet metal part, all of the press-in pins 41 and all of the spring contact elements 45 can be formed in one piece with the rest of the sheet metal wall. The connection element 40 preferably has a frame profile with open end faces. One, two or more press-in pins are then arranged projecting from the terminating edge 42 on two opposite outer surfaces of the connection element 40. Furthermore, one, two or more spring contact elements 45 are then likewise arranged projecting from the terminating edge 42 on the other two opposite outer surfaces. A spring contact element 45 is designed, for example, as an arc which in each case opens into the terminating edge 42 at the end thereof. From a mechanical point of view, this is a beam element which is clamped at both ends and which can be elastically deformed centrally in relation to the recess. In addition to the four press-in pins shown in the exemplary embodiment, a further four abutment contact points 45 can be used by the shown spring contact element 45 for a ground connection of the electric plug 100. When the plug 100 is pressed in, a spring contact element 45 preferably extends at most to the outer surface of the plug housing 60 or of the connection element 40. For example, the spring contact element is formed in a sheet metal plane of the connection element 40. Alternatively, the spring contact element can run relative to the outer surface, so that an abutment contact point 46 can be formed in the direction of the data lines 20.

Figure 1B:
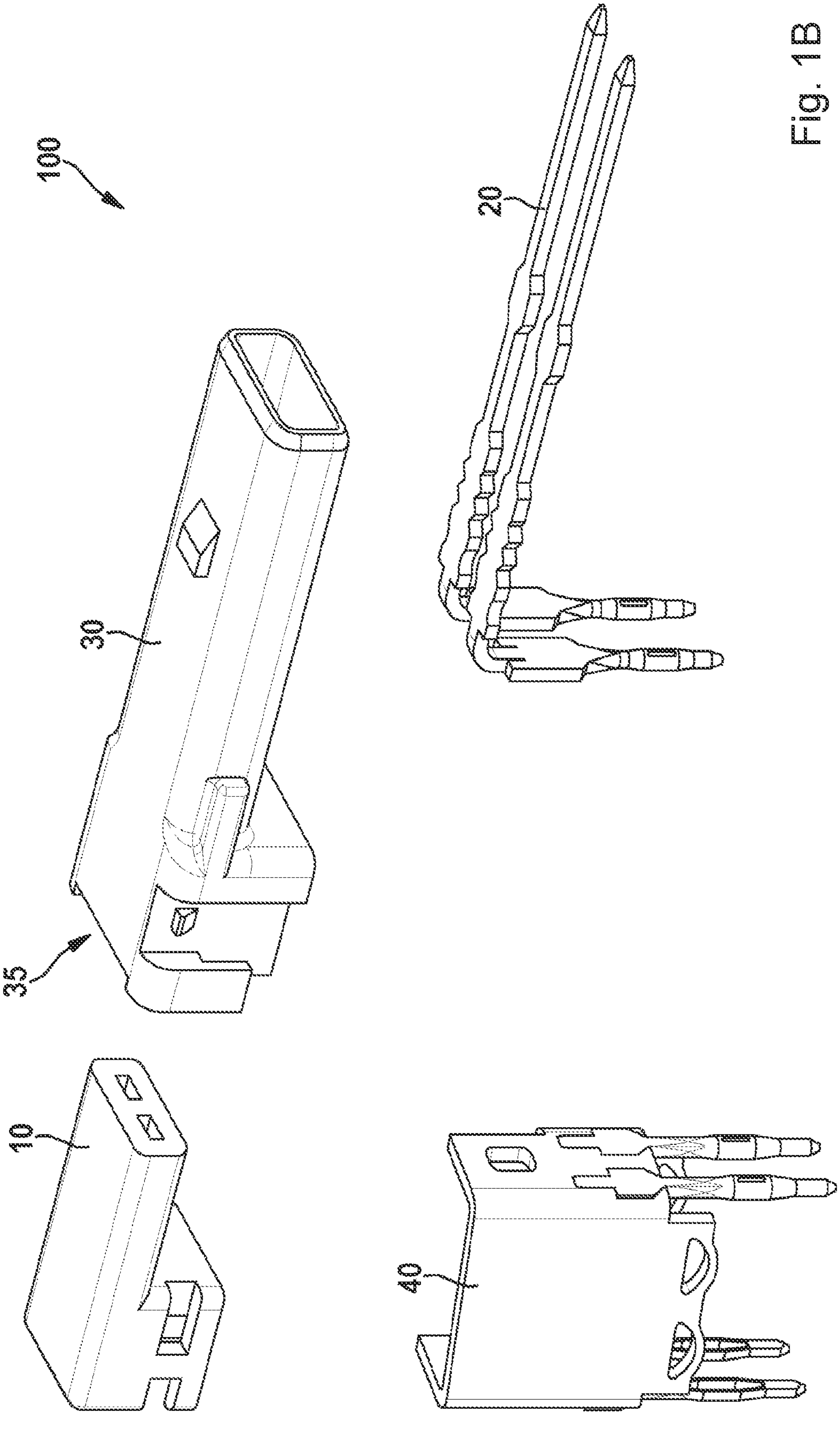
FIG. 1B shows the angled shielded electric plug from FIG. 1A in an exploded view.

FIG. 1B shows the angled shielded electric plug from FIG. 1A in an exploded view. An insulation body 10 into which the data lines 20 are inserted so as to be accommodated is also visible. This insulating body is then arranged within the shielding housing 30 through a receiving opening 35. This receiving opening 35 is then in turn covered by the connection element 40 after connection to the connection element, such that a shielding effect of the shielding housing 30 is maintained.

Figure 1C:
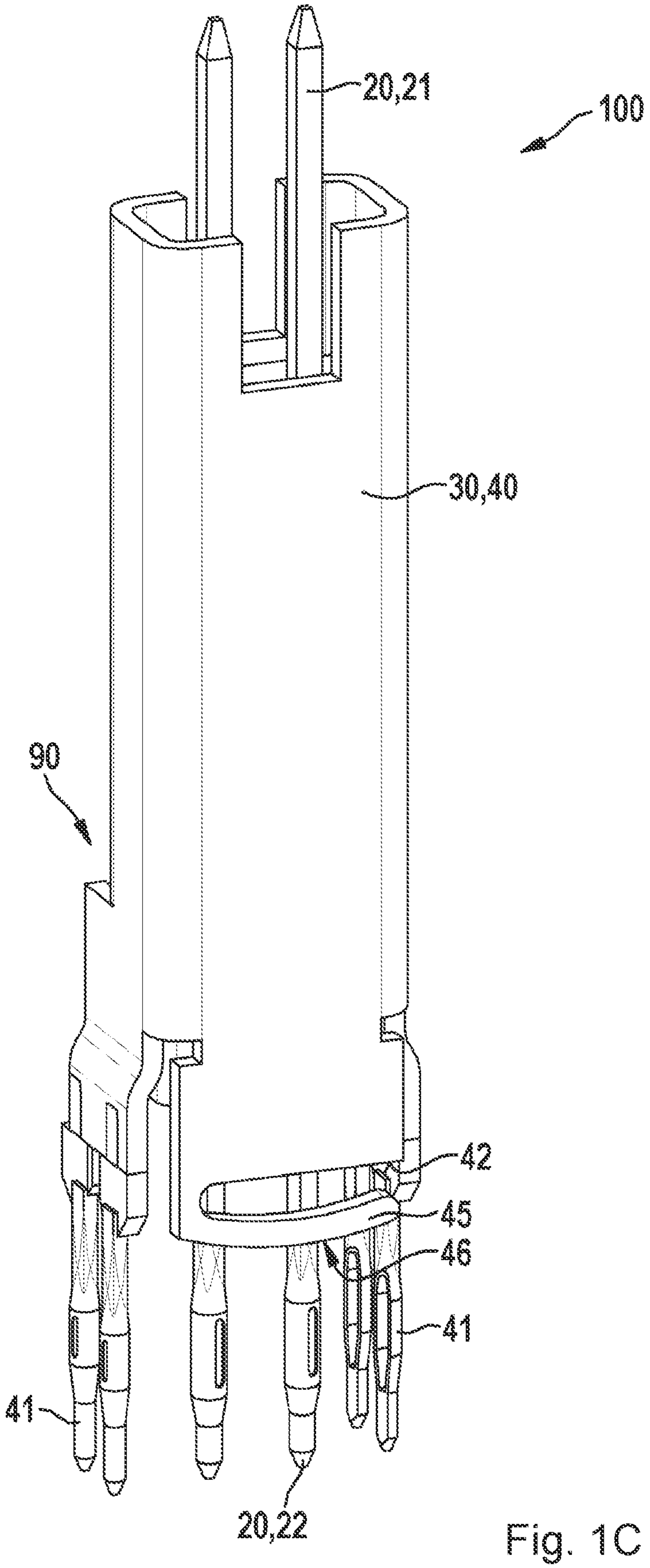
FIG. 1C shows a second embodiment of a shielded electric plug as a straight plug design in a perspective view, according to the present invention.

FIG. 1C shows a second exemplary embodiment of a shielded electric plug as a straight connector design. In this case, the connection element 40 is formed in one piece with the shielding housing 30, in particular as a shaped sheet metal part. A possible difference from FIG. 1A is also shown in the design of the spring contact element 45. This element is designed with an arcuate shape which only opens into the terminating edge 42 at one arc end, while the other end projects freely at a distance from the terminating edge 42. From a mechanical point of view, this is a beam element which is clamped at one end. In principle, however, a straight plug 100 can be designed in the same way as an angled plug 100, specifically so as to comprise a metal shielding housing, for example as a die-cast part, and a connection element 40 connected thereto, for example as a bent sheet metal part.

Figure 2A:
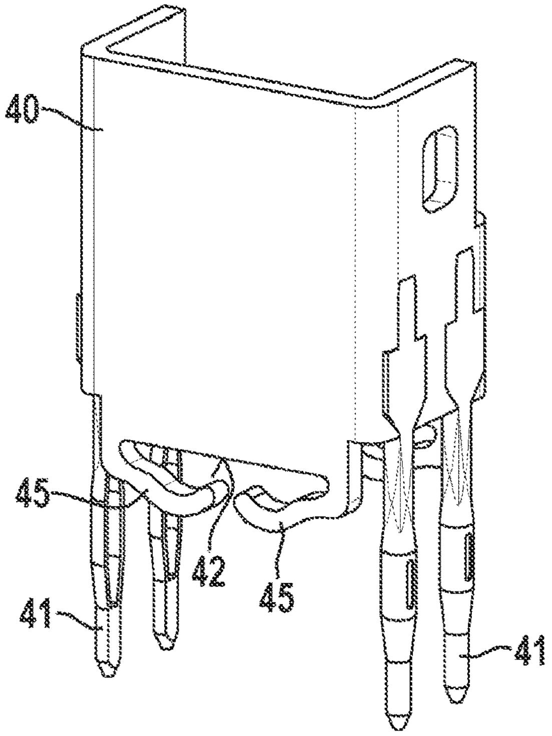
FIG. 2A shows a further embodiment of a connection element of a shielded electric plug in a perspective view, according to the present invention.
Figure 2B:
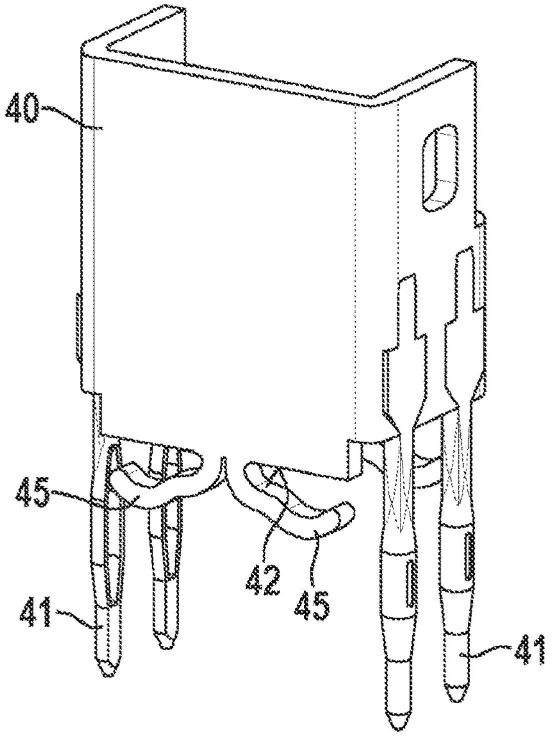
FIG. 2B shows a further embodiment of a connection element of a shielded electric plug in a perspective view, according to the present invention.

FIGS. 2A and 2B show further exemplary embodiments of a connection element 40 of a shielded electric plug 100 in a perspective view. In this case, two spring contact elements 45 are arranged on opposite sides—comparable to those in the embodiment in FIGS. 1A and 1B. However, the shape of the spring contact elements 45 corresponds to that in the embodiment in FIG. 1C, wherein the respective free ends in FIG. 2A face one another and in FIG. 2B face away from one another. In particular, the spring contact elements 45 are arranged in alignment in a line, more preferably in a sheet metal plane.

Figure 2C:
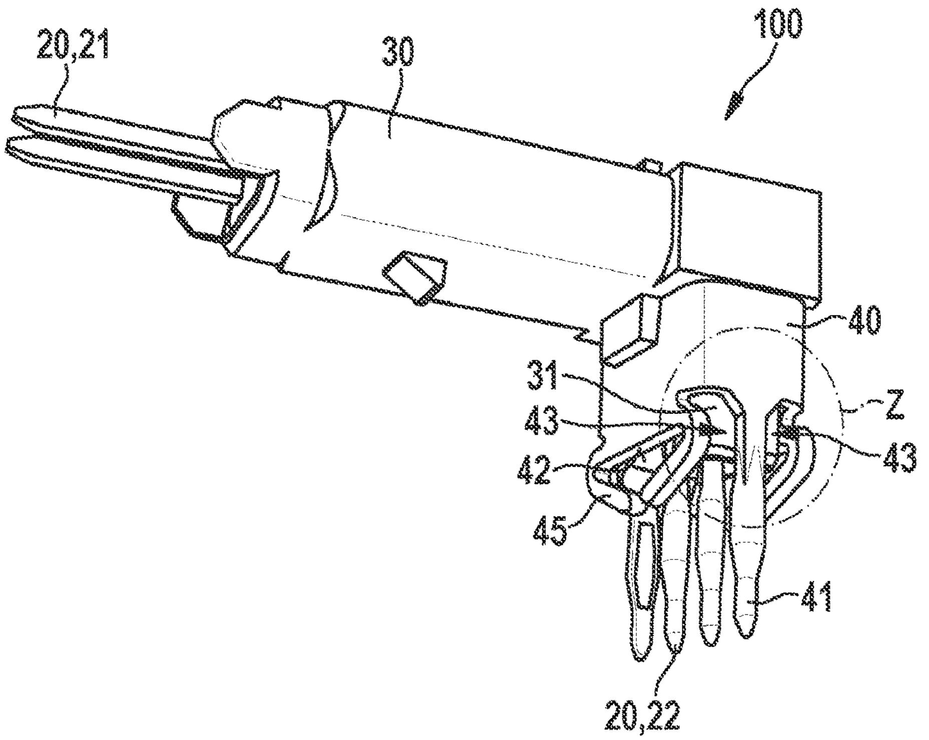
FIG. 2C shows a further embodiment of an angled shielded electric plug in a perspective view, according to the present invention.

FIG. 2C shows the shielded electric plug 100 with a connection element, as shown in FIG. 2A, again in a perspective view. In particular, one side of the connection element 40 having a projecting press-in pin 41 can be seen. In the transition region of this side to the relevant adjacent side of the connection element 40 with the projecting spring contact elements 45, recesses 43 are formed in the connection element 40, for example due to manufacturing-related reasons. The shielding housing 30 has lateral webs 31 which overlap at least in regions on the inside of the connection element 40 with the side on which the press-fit pins 41 project in each case. The webs 31 extend over the terminating edge 42 for the press-fit pins 41, but at most to the terminating edge 42 of the spring contact elements 45. In this way, the recesses 43 are covered by the webs 31, so that an optimal shielding of the data lines 20 is maintained.

Figure 3A:
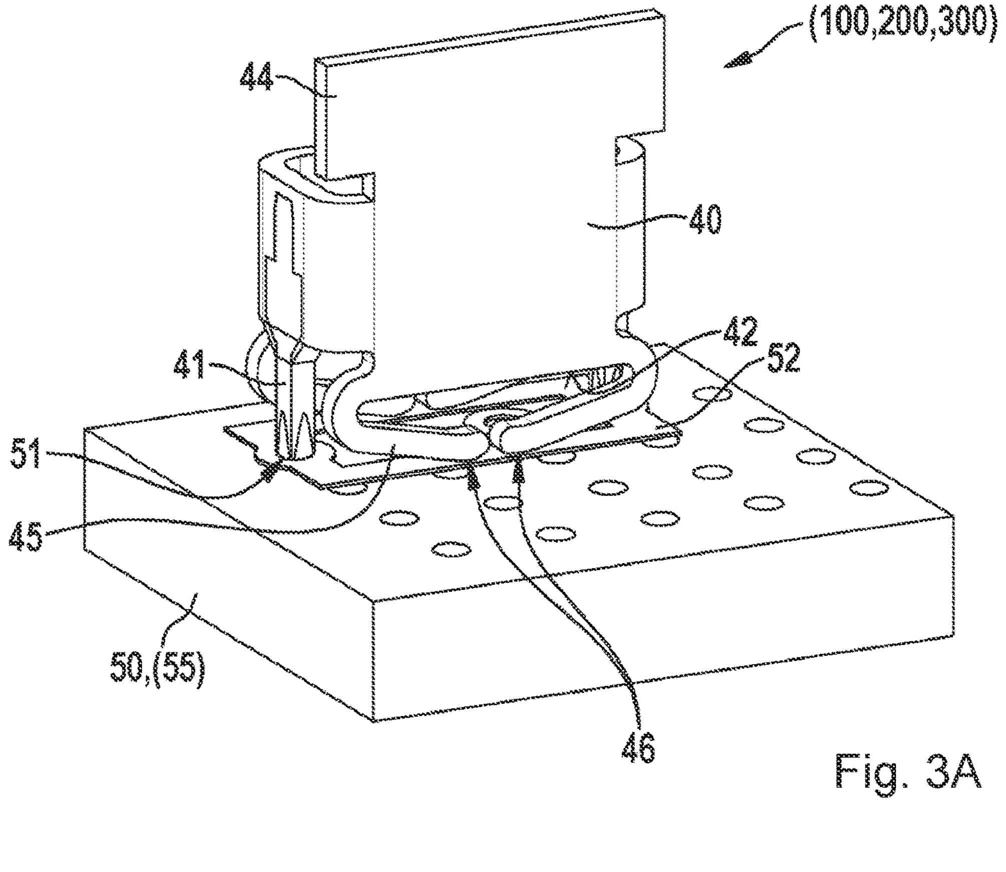
FIG. 3A shows a simplified perspective view of a contact arrangement comprising a circuit carrier and a shielded electric plug connected thereto, according to an example embodiment of the present invention.

FIG. 3A shows a simplified perspective view of a contact arrangement 200, comprising a circuit carrier 50 and a shielded electric plug 100 ground-connected thereto. For the sake of simplification, only the connection element 40 of the electric plug 100 is shown. This corresponds, for example, to an embodiment as shown in FIG. 2A, but only one press-in pin 41 in each case is formed on opposite sides. Furthermore, a kind of projecting tab 44 is formed on the side opposite the end region, for example. For permanent connection by means of a press-in connection, the tab can be accommodated pressed into a complementary recess in the shielding housing 30—as a possible alternative to a latching connection described above. The electric plug 100 is shown in a pressed-in state, for example in a final mounting position. The circuit carrier 50 in this case has press-in openings 51 with an inner metallization. The press-fit pins 40 of the connection element 40 are fastened in two corresponding press-in openings 51 and are preferably pressed against the metallized inner wall by means of a press-in tool in a force-guided manner. To simplify insertion for the start of a press-in process, the press-in pins 41 are somewhat longer than the press-in pins 21 of the data lines, for example 0.5-1.5 mm longer. A surface region of the circuit carrier 50 facing the spring contact elements 45 likewise has a metallization 52. With the press-in process, the respective free ends of the spring contact elements 45 come into contact with the metallized surface region 52 in a resiliently abutting manner to form abutment contact points 46. Until the final mounting position is reached, the spring contact elements 45 are elastically deformed in the direction of the terminating edge 42. The abutment contact points 46 formed are thus subjected to force. Not only the metallized inner wall of the press-in openings 51 but also the metallized surface region of the circuit carrier 50 have a ground potential of the electrical circuit 55 (not shown).

Figure 3B:
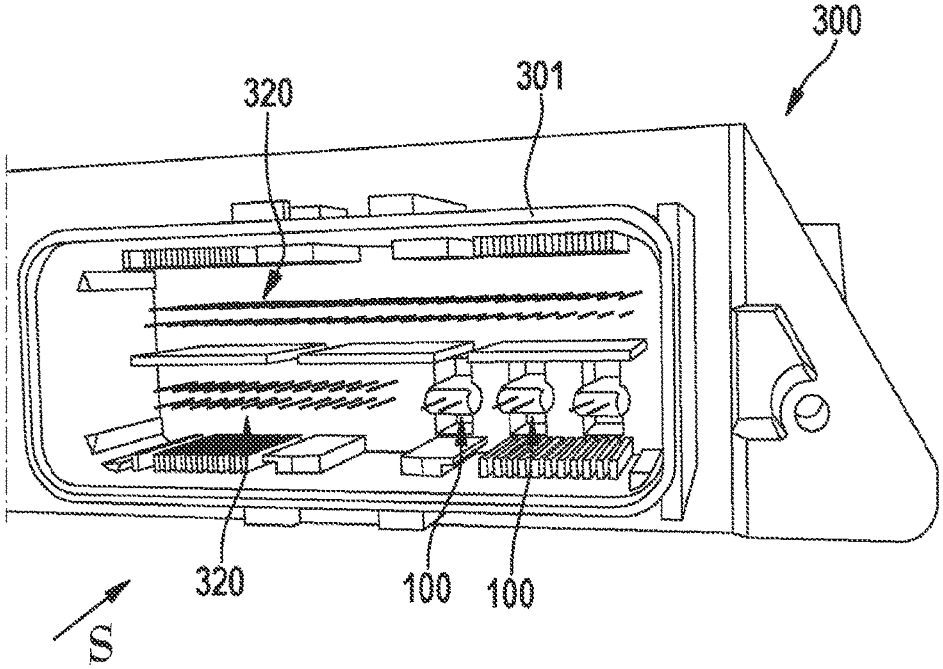
FIG. 3B shows the contact arrangement of FIG. 3A, comprising a multi-pole connector in which a plurality of shielded electric plugs are accommodated, in a perspective view with a view of the plug side of the multi-pole connector.

FIG. 3B shows a multi-pole connector 300. The perspective illustration shows the multi-pole connector 300 in a view onto the plug side S. In this case, one, two or more electric plugs 100 are also accommodated within a plug collar 301. In the present exemplary embodiment, in addition to a possible accommodation of exclusively electric plugs 100, further contact connection elements 320 are accommodated in a linear arrangement. In this case, the contact connection elements 320 are part of at least one further plug type that is different from the electric plug 100. For example, the contact connection elements 320 are signal pins or power supply pins.

Figure 3C:
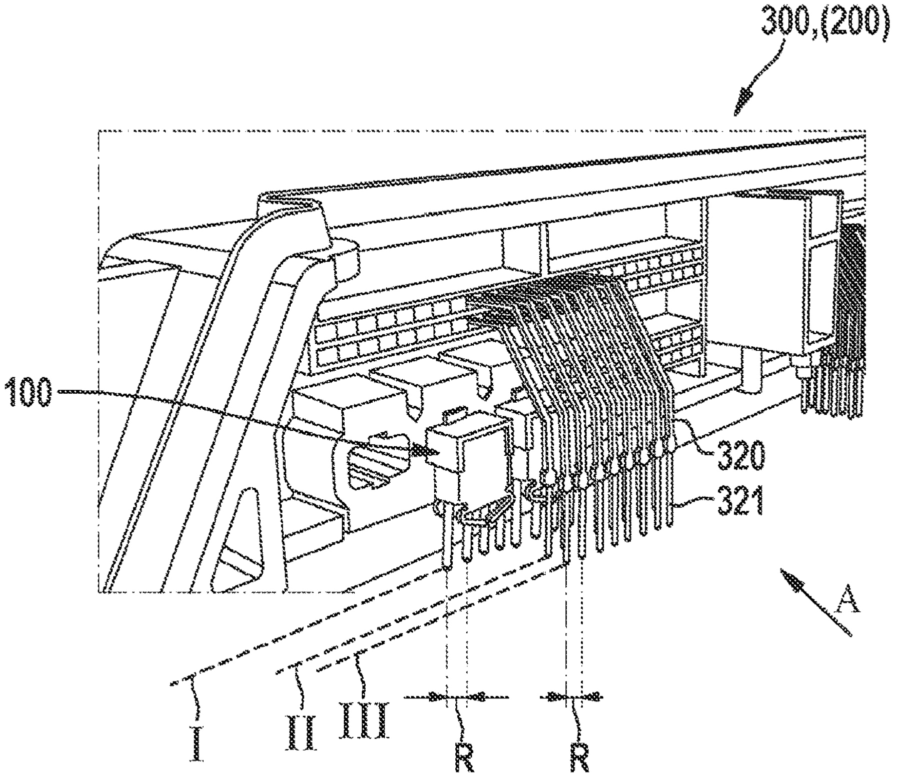
FIG. 3C shows the multi-pole connector from FIG. 3B in a perspective view with a view of the connection side of the multi-pole connector.

FIG. 3C shows the multi-pole connector 300 from FIG. 3B in a view onto its connection side A. For clarity, individual elements are simply hidden. The contact connection elements 320 also have press-in pins 321 on their connection side. Such a multi-pole connector 300 can form a contact arrangement 200 with a circuit carrier 50—comparable to that shown in FIG. 3A. With a press-in process, all press-in pins 21, 41, 321 are pressed into corresponding press-in openings 51 of the circuit carrier 50. In the first row I, the contact connection elements 320 are arranged in a linear arrangement with the press-in pins 41 of the connection element 40 that are contacted at ground potential. Not only within a row I having the electric plug 100 but also within a row II, III without an electric plug 100, an equal grid spacing R is maintained within a linear arrangement formed in the row I, II, III.

In principle, embodiment elements of the various embodiments of a connection element 40 shown can be combined with one another or adapted or modified accordingly. In this respect, shielded electric plugs 100 can be realized very broadly for different application requirements.

What is claimed is:

1. A shielded electric plug, comprising:

a plug housing;

at least one data line arranged within the plug housing for transmitting data in a Gbit/s range, at least one plug side of the data line electrically contacting the electric plug with a complementary mating plug, and a connection side of the data line for electrically contacting with a circuit carrier, the at least one data line being enclosed at least between the plug side and the connection side by a metal shielding housing;

wherein the plug housing includes at least one connection element with at least one press-in pin for mechanically contacting the electric plug with the circuit carrier using a press-in connection, the connection element having at least one spring contact element configured to contact the circuit carrier with resilient abutment in a pressed-in state of the electric plug, wherein the at least one press-in pin is a first ground connection of the electric plug, and the at least one spring contact element is at least one second ground connection of the electric plug.

2. The shielded electric plug according to claim 1, wherein the connection element is formed from a shaped sheet metal part as a bent sheet metal part, wherein the at least one press-in pin and the at least one spring contact element are formed in one piece.

3. The shielded electric plug according to claim 1, wherein the connection element is an end region of the plug housing facing the plug side, from which end region the at least one press-in pin and/or the at least one spring contact element projects in a press-in direction.

4. The shielded electric plug according to claim 1, wherein the connection element or the connection element in abutting contact with a wall portion of the shielding housing, encloses the at least one data line over a longitudinal extension of the at least one data line in an end region of the plug housing, wherein the at least one press-in pin and/or the at least one spring contact element are arranged on opposite sides with respect to the at least one data line.

5. The shielded electric plug according to claim 1, wherein the connection element forms an outer surface of the plug housing, and wherein the spring contact element extends at most to the outer surface when the electric plug is pressed in.

6. The shielded electric plug according to claim 1, wherein the spring contact element is a flexural member including a beam element clamped at one or both ends.

7. The shielded electric plug according to claim 6, wherein the beam element is integrally formed on the connection element and has an arcuate shape to create a defined abutment contact point when the electric plug is pressed in.

8. The shielded electric plug according to claim 6, wherein at least two beam elements are arranged adjacent to one another, including in alignment in a line, wherein the beam elements are clamped at one end, and a respective free ends face one another or face away from one another.

9. The shielded electric plug according to claim 1, wherein the connection element is formed in one piece with the shielding housing.

10. The shielded electric plug according to claim 1, wherein the connection element is electrically contacted with or connected to the shielding housing: i) using a snap-in connection, and/or ii) using a press-in connection, and/or iii) using a clamping connection, and/or iv) using an insulation-displacement connection, and/or v) using a bonded connection.

11. The shielded electric plug according to claim 1, wherein the at least one data line is accommodated in an insulating body which is arranged within the shielding housing through a receiving opening, wherein the receiving opening for the insulating body is covered by the at least one connection element in such a way that a shielding effect of the shielding housing is maintained.

12. The shielded electric plug according to claim 1, wherein the shielding housing, at least in end region of the plug housing, overlaps with the connection element at least in regions, but at most as far as the at least one spring contact element, wherein recesses in the connection element are covered by the shielding housing to ensure a shielding effect, in a region of the at least one press-in pin.

13. A contact arrangement, comprising:

at least one shielded electric plug, including:

a plug housing;

at least one data line arranged within the plug housing for transmitting data in a Gbit/s range, at least one plug side of the data line electrically contacting the electric plug with a complementary mating plug, and a connection side of the data line for electrically contacting with a circuit carrier, the at least one data line being enclosed at least between the plug side and the connection side by a metal shielding housing;

wherein the plug housing includes at least one connection element with at least one press-in pin for mechanically contacting the electric plug with the circuit carrier using a press-in connection, the connection element having at least one spring contact element configured to contact the circuit carrier with resilient abutment in a pressed-in state of the electric plug, wherein the at least one press-in pin is a first ground connection of the electric plug, and the at least one spring contact element is at least one second ground connection of the electric plug; and the circuit carrier, the circuit carrier having at least one or more press-in openings into which the electric plug is pressed with the at least one press-in pin or further press-in pins, in each case against a metallized inner wall, wherein the at least one spring contact element or further spring contact elements in each case contacts a metallized region of the circuit carrier with resilient abutment, and wherein the respectively metallized inner wall and the respectively metallized region of the circuit carrier have a ground potential of an electrical circuit of the circuit carrier.

14. The contact arrangement according to claim 13, further comprising:

a multi-pole connector with at least one plug collar configured to receive a multi-pole hybrid plug, wherein the at least one electric plug, and a plurality of further contact connection elements that differ from the at least one electric plug, are arranged within the plug collar for the hybrid plug, wherein the contact connection element and the at least one data line of the at least one electric plug have press-in pins on a connection side to the circuit carrier, which, in a linear arrangement with the press-in pin of the at least one electric plug that is contacted at ground potential, are in each case pressed into press-in openings of the circuit carrier while maintaining an equal grid spacing within the linear arrangement.

15. A method for forming a contact arrangement including a shielded electric plug and a circuit carrier, the shielded electric plug including:

a plug housing;

at least one data line arranged within the plug housing for transmitting data in a Gbit/s range, at least one plug side of the data line electrically contacting the electric plug with a complementary mating plug, and a connection side of the data line for electrically contacting with the circuit carrier, the at least one data line being enclosed at least between the plug side and the connection side by a metal shielding housing;

wherein the plug housing includes at least one connection element with at least one press-in pin for mechanically contacting the electric plug with the circuit carrier using a press-in connection, the connection element having at least one spring contact element configured to contact the circuit carrier with resilient abutment in a pressed-in state of the electric plug, wherein the at least one press-in pin is a first ground connection of the electric plug, and the at least one spring contact element is at least one second ground connection of the electric plug, wherein the circuit carrier has at least one or more metallized press-in openings each with a metallized inner wall and at least one metallized region on a circuit carrier side for mechanical and electrical connection of the electric plug, wherein the metallized press-in openings and the at least one metallized region each have a ground potential of a circuit of the circuit carrier, the method comprising the following steps:

pressing the at least one press-in pin of the connection element of the electric plug into the one or more press-in openings of the circuit carrier to form at least one first ground connection; and terminating the press-in process when a final mounting position of the electric plug is reached, wherein at the latest when the final mounting position is reached, the metallized region of the circuit carrier is contacted with resilient abutment by the at least one spring contact element of the connection element of the electric plug to form at least one second ground connection.

16. A multi-pole connector with at least one plug collar for receiving a multi-pole hybrid plug, wherein at least one shielded electric plug and a plurality of further contact connection elements that differ from the electric plug, are arranged within the plug collar for the hybrid plug, the at least one electric plug including:

a plug housing;

at least one data line arranged within the plug housing for transmitting data in a Gbit/s range, at least one plug side of the data line electrically contacting the electric plug with a complementary mating plug, and a connection side of the data line for electrically contacting with the circuit carrier, the at least one data line being enclosed at least between the plug side and the connection side by a metal shielding housing;

wherein the plug housing includes at least one connection element with at least one press-in pin for mechanically contacting the electric plug with the circuit carrier using a press-in connection, the connection element having at least one spring contact element configured to contact the circuit carrier with resilient abutment in a pressed-in state of the electric plug, wherein the at least one press-in pin is a first ground connection of the electric plug, and the at least one spring contact element is at least one second ground connection of the electric plug;

wherein the contact connection element and the at least one data line of the at least one electric plug have press-in pins on a connection side for the circuit carrier.

* * * * *